United States Patent [19]

Hujsak

[11] Patent Number: 4,961,550
[45] Date of Patent: Oct. 9, 1990

[54] METHOD AND DEVICE FOR PROTECTING A LIQUID ROCKET BOOSTER FROM IMPACT AND ENVIRONMENTAL DAMAGE TO PERMIT RECOVERY AND REUSE

[75] Inventor: Edward J. Hujsak, La Jolla, Calif.

[73] Assignee: General Dynamics Corporation, Convair Division, San Diego, Calif.

[21] Appl. No.: 301,774

[22] Filed: Jan. 26, 1989

[51] Int. Cl.$^5$ .............................................. B64D 45/00
[52] U.S. Cl. ................................. 244/138 R; 244/121; 244/160
[58] Field of Search ............... 239/265.11, 288, 288.3, 239/288.5; 244/121, 138 R, 160

[56] References Cited

U.S. PATENT DOCUMENTS

| | | | |
|---|---|---|---|
| 3,286,951 | 11/1966 | Kendall | 244/158 R |
| 4,166,598 | 9/1979 | Seifert et al. | 244/160 |
| 4,830,314 | 5/1989 | Hujsak | 244/160 |
| 4,832,288 | 5/1989 | Kendall et al. | 244/160 |

*Primary Examiner*—Charles T. Jordan
*Assistant Examiner*—Richard W. Wendtland
*Attorney, Agent, or Firm*—John R. Duncan; Frank D. Gilliam

[57] ABSTRACT

A method and device for protecting a first stage liquid rocket booster from impact damage and environmental damage so as to permit recovery from a sea water landing and reuse without major rehaul of the rocket engine of the booster. A cylindrical double walled structural member encircles the nozzles of the rocket engine and precludes impact damage after the booster has landed nose first in the water. A flexible water impervious sleeve means is carried within the double walled structural member and deployed prior to impact. The sleeve extends from the booster and collapses inwardly upon itself to prevent entry of sea water into the rocket engine and associated equipment.

7 Claims, 2 Drawing Sheets

METHOD AND DEVICE FOR PROTECTING A LIQUID ROCKET BOOSTER FROM IMPACT AND ENVIRONMENTAL DAMAGE TO PERMIT RECOVERY AND REUSE

BACKGROUND OF THE INVENTION

1. Field of the Invention

This invention relates to an improvement in space vehicles and more particularly, but not by way of limitation, to an improved liquid propellant rocket booster for launching a space vehicle, which booster includes an arrangement for precluding crash damage and sea water damage to the rocket booster engine when the booster returns to a salt water body for recovery.

2. Description of the Prior Art

It is well known in the art, to associate a number of solid and liquid rocket boosters and a space vehicle in order to launch a space vehicle or a payload into a desired orbit around the earth or other desired extraterrestrial path. It is common to use solid rocket boosters and liquid propellant rocket boosters to propel the associated space vehicle to at least a desired first stage of travel. At present, after a launch an attempt is made only to recover, refurbish and reuse solid rocket boosters. The reason for this is that rocket boosters commonly descend into salt water bodies for recovery. Salt water damage to a solid rocket booster is considered to be of minor consequence since the relatively simple rocket motors of such boosters are completely rebuilt prior to reuse. However, in the instance of liquid propellant rocket boosters the crash damage to the rocket engine upon descent of the booster into a salt water body and the subsequent entry of salt water into the thrust chambers and interior of the complex liquid propellant turbopumps render a liquid propellant rocket booster incapable of reuse without having first undergone expensive major overhaul.

Accordingly, it is of paramount importance if an attempt is to be made to reuse a liquid propellant rocket booster to protect the rocket engine from potential impact damage as the liquid rocket booster descends into a salt water body, such as an ocean, and to preclude resulting environmental damage to the engine prior to recovery of the rocket booster from the sea water. Failure to provide adequate protection form these dangers would render a liquid propellant rocket booster uneconomical to use in comparison to a solid rocket booster.

Past attempts at protecting a liquid propellant rocket from such damage have proved to be unsatisfactory. Such efforts have included large mechanically operated closures for the thrust end of the rocket engine. Such a closure was moved from a stowed position outboard of the booster to a deployed position so that the open end of the rocket engine would be sealed in the manner of sealing a jar with a lid.

These devices unfortunately are very heavy, involve complex mechanisms, and cause severe interface problems with the conventional means for securing a rocket booster and associated space vehicle to a launch pad. The problem of adequately protecting a liquid propellant rocket booster for recovery from a salt water body in a practical manner has not been provided by the prior art.

The present invention does provide a simple, low cost, lightweight practical solution to the problem of providing adequate protection for a liquid propellant rocket booster to enable reuse thereof after recovery from a salt water body. It has current importance in the art since it is contemplated that the rocket boosters for a space vehicle such as the NASA advanced space shuttle of the United States will utilize liquid rocket boosters in place of solid rocket boosters.

The following patents, while of interest in the general field to which the invention pertains, do not disclose the particular aspects of the present invention that are of significant interest.

U.S. Pat. No. 4,504,031 issued on Mar. 12, 1985 to Dana G. Andrews discloses an inflatable braking member that is deployed around a space vehicle by introducing gas into it. The reduction of velocity of the vehicle is controlled by directly varying the drag of the vehicle to compensate for variations in the density of the atmosphere by varying the thrust of the main rocket motor of the space vehicle and/or varying the shape of the braking member as the space vehicle descends, main rocket nozzle end first. The braking member is jettisoned after the space vehicle leaves the atmosphere to enter a low earth orbit.

U.S. Pat. No. 4,426,038 issued on Jan. 17, 1984 to Frank S. Inman et al discloses a non-radiating cloth exit cone for a flared woven refractory cloth structure having the shape of the frustrum of a cone with refractory felt sewn to the exterior surface of the cloth structure for thermal insulation of the cloth structure and a sacrificial ablative material incorporated in the interior surface of the cloth structure. The cloth structure is stowed in a collapsed or retracted configuration and is extended to an operating position after motor ignition to provide a large expansion ratio nozzle for a rocket motor.

U.S. Pat. No. 4,638,947 issued on Jan. 27, 1987 to Vance W. Jaqua et al also relates to a rocket engine nozzle extension. A pneumatic bag within the fixed nozzle of a rocket engine is inflated to push and unfold the nozzle extension. After the nozzle extension is completely formed, the pneumatic bag may be jettisoned by firing the rocket engine.

U.S. Pat. No. 3,711,027 issued on Jan. 16, 1973 to Lee F. Carey relates to an extendable nozzle for a rocket engine. The nozzle extension is deployable from a compactly stowed condition to an extended length condition and features the use of a frusto-cone shaped member formed of thin and lightweight convoluted sheet material, such as columbium or an aluminum foil honeycomb stock. A temporary jettisonable cover member is pressurized to unfurl the extendible nozzle and then is detached.

U.S. Pat. No. 3,482,783 issued Dec. 9, 1969 to F. R. Nebiker et al relates to an inflatable rocket nozzle which includes an inner fabric formed to the shape of a high area-ratio nozzle, an outer fabric spaced from but substantially conforming to the shape of the inner fabric and a plurality of drop yarns extending between and attached to each of the fabrics to hold the fabrics in a predetermined spaced apart relationship when they are moved apart. Pressure means expand the inflatable nozzle when the rocket has risen to an altitude in the earth's atmosphere.

None of the prior art uncovered discloses a method and an arrangement to protect a liquid propellant booster rocket from crash damage and environmental damage for recovery of the rocket booster from a sea water landing so as to permit reuse thereof without major overhaul.

SUMMARY OF THE INVENTION

In accordance with a preferred embodiment of the present invention, there is provided in a liquid propellant booster rocket for a space vehicle that has liquid propellant tanks and a turbopump rocket engine and a parachute system which permits a controlled descent of the booster in a nose down attitude after separation from the space vehicle, a crash protection arrangement which permits recovery and reuse of the rocket booster after landing in a body of sea water. The crash protection device includes double walled cylindrical structural means which extend aft from the aft end of the booster so as to encircle the rocket engines and protect them from damage upon impact in the sea water and extensible sleeve means that are carried by the cylindrical structure means which are deployed prior to impact of the booster in the sea water. The water impermeable flexible sleeve means extend from the booster as it floats in the sea water, and by collapsing against itself along its length by means of surface tension between adjacent surfaces of said sleeve means, preclude migration of the sea water into the rocket engine and associated turbopumps.

Other features and attendant advantages of the present invention will become apparent to those skilled in the art from a reading of the following detailed description constructed in accordance with the accompany drawings and wherein:

DESCRIPTION OF THE PREFERRED EMBODIMENT

Figure 1A:
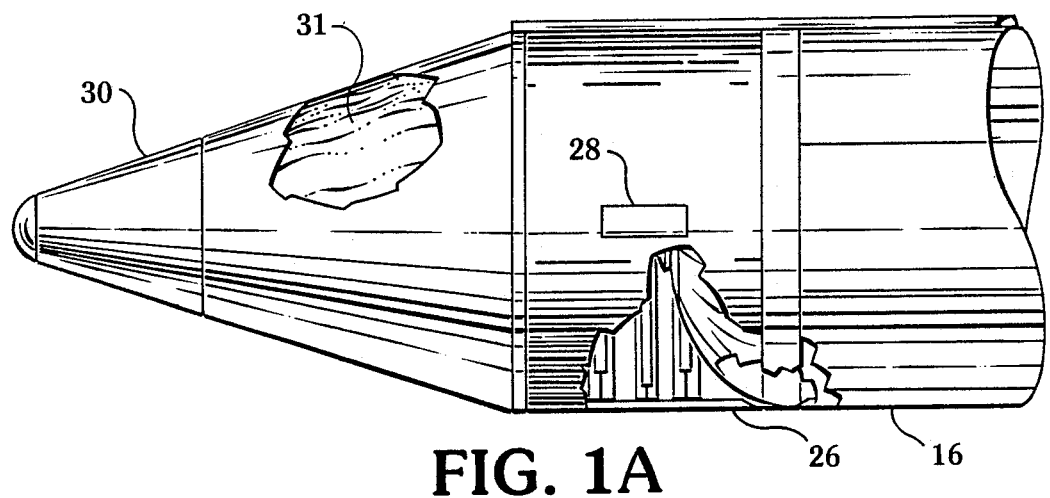
FIGS. 1 A-C when taken together is a diagrammatic illustration of a preferred embodiment of an improved liquid propellant rocket booster having a protective arrangement constructed in accordance with the principles of the present invention.
Figure 1B:
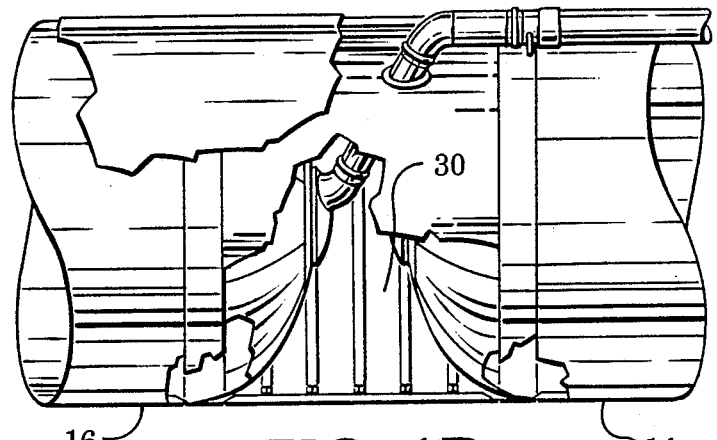

Referring now to the drawings in detail and in particular to FIGS. 1 A-C, the reference character 10 generally designates a protective arrangement for a liquid propellant rocket booster constructed in accordance with a preferred embodiment of the present invention. The protective device 10 is coupled to a liquid propellant rocket booster 12 which, as illustrated in the accompanying drawings, is intended to be exemplary of liquid propellant rocket boosters in general and not limiting. The liquid propellant rocket booster 12 which is separably coupled to a suitable space vehicle (not shown) to assist in the launch of the space vehicle form the surface of the earth at approximately sea level to a predetermined altitude at which point the booster 12 having substantially exhausted its fuel and having accomplished its portion of the mission separates from the space vehicle.

The exemplary booster 12 includes a fuel tank 14 and an oxidizer tank 16. The fuel tank 14 is provided with the usual complementary piping and a fill and interface 18. Similarly, the oxidizer tank 16 is provided with a suitable fill and interface 20 and associated piping which is illustrated in a simplified manner. The booster 12 is provided with the usual aft attachment ring 22, aft attachment plane 24, a forward attachment plane 26, and a forward attachment 28.

A pressurized and sealed intertank compartment 30 separates the fuel and oxidizer tanks 14 and 16. Suitable thermal insulation is provided for the tanks 14 and 16 and the booster 12 in general. Attached to the forward attachment plane 28 is a parachute compartment 30 which contains suitable parachute means 31 which may be selectively deployed after the booster 12 has been separated from its associated space vehicle. The parachute means 31 stowed within the parachute compartment 30 is only generally illustrated since it is well known within the art.

Figure 1C:
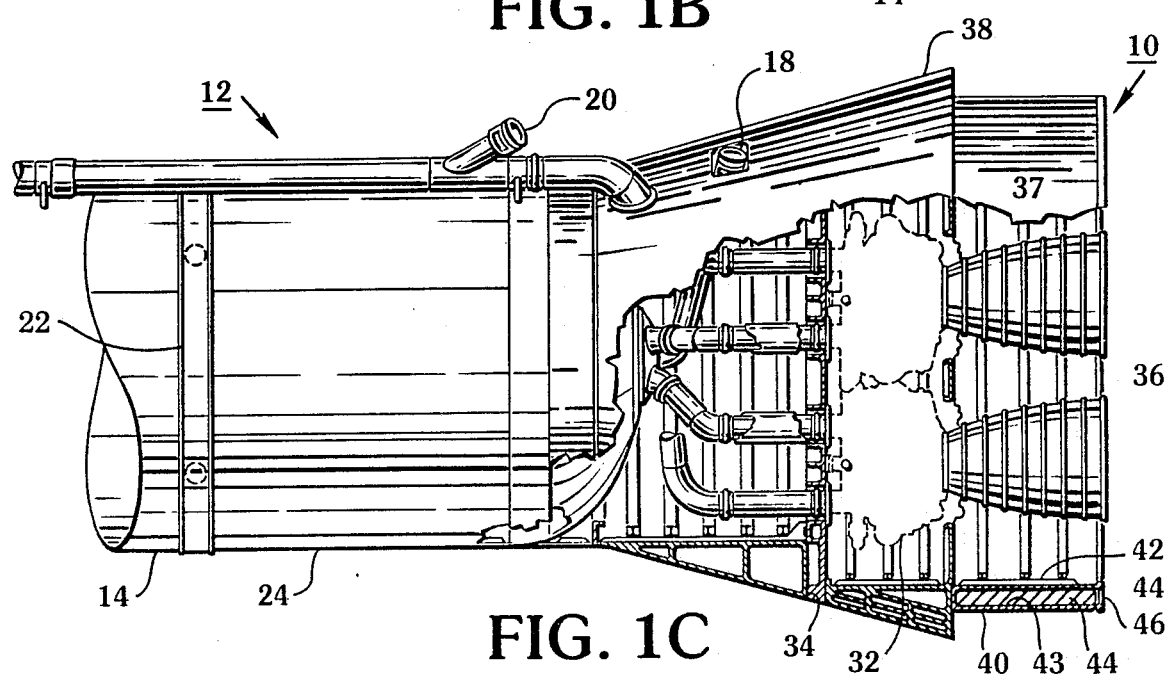

Deployment of the parachute 31 within the compartment 30 permits the booster 10 to descend in a nose down attitude to assist in the protection of the rocket engine 32 of the booster 12. Referring now to FIG. 1C it will be seen that the booster 12 includes a suitable thrust plate 34 to which the rocket engine 32 is coupled. The rocket engine 32 is understood to include the usual turbopumps to pump the fuel and oxidizer from the tanks 14 and 16 for burning and exhaust through the associated nozzles 36. The nozzles 36 project aft beyond the firewall 37 of the booster 12.

It will understood and appreciated that if the booster 12 were allowed to descend tail first into a body of water such as sea water without having the advantage of the protection of the invention 10 then the rocket engine 32 would be susceptible to impact damage upon landing and the entry of salt water into the interior of the turbopumps and associated equipment of the rocket engine 32 would cause severe corrosive and environmental damage that would necessitate an expensive overhaul prior to reuse of the booster 12. It will be seen that a pressurized sealed aft compartment 38 surrounds and contains the rocket engine 32 with the nozzle 36 extending aft from the firewall 37 of such compartment 38.

The crash protection system 10 of the present invention includes a plurality of spaced apart cylindrical structured members 40 and 42 which are suitable secured to the firewall 37 of the aft compartment 38 and that extend aft a distance equal at least to the furthermost extension of the nozzles 36 and in the illustrated embodiment the ends of the nozzles 36 and the structured members 40 and 42 generally lie in the same plane. The first function the cylindrical members 40 and 42 perform is to preclude structural damage to the rocket engine nozzles 36 when the booster 12 impacts the water body in its descent and the aft portion of the booster 12 is, in effect, slapped against the surface of the body of water.

Figure 2:
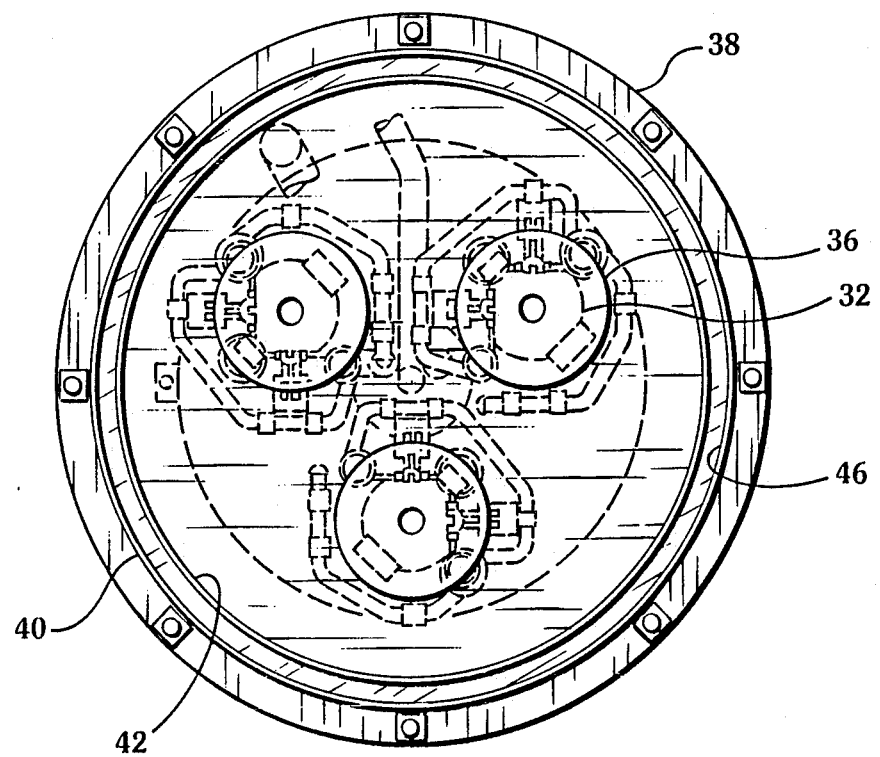
FIG. 2 is an end view of the liquid rocket booster illustrated in FIG. 1.

The second function the cylindrical structural members 40 and 42 perform is to provide an annular storage compartment 43 for a sleeve means 44, shown in its stowed position in FIG. 1C and which will be described in more detail hereinafter. The sleeve compartment 43 formed by the cylindrical structured members 40 and 42 is closed by a suitable cap means 46 which is adapted to be selectively blown off or separated from the booster 12 prior to impact of the booster 12 in the water. The blow-off cover 46 can be arranged to draw the sleeve means 44 from its stowed position. In any event, it is well known to deploy a flexible sleeve for a space vehicle as per the above discussion of the cited prior art. FIG. 2 shows the blow off cover 46 of the sleeve compartment 43 in its stowed position and provides a more clear understanding of how the annular cylindrical structural members 40 and 42 encircle and protect the nozzles 36 of the rocket engine 32.

Figure 3:
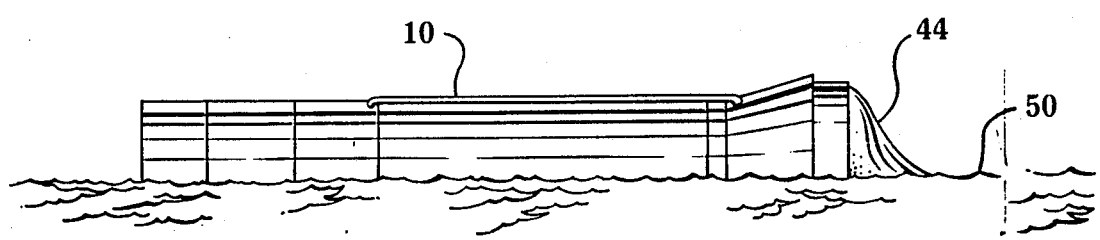
FIG. 3 is a perspective view of the liquid rocket booster shown in FIG. 1 after the flexible sleeve means of protective arrangement has been deployed and the booster has descended into a body of salt water.

Referring now to FIG. 3, it will be seen that the liquid propellant rocket booster 12 has landed in a body of sea water 50 such as an ocean. Prior to impact of the booster 10 in the water 50, the blow off cover 46 has been separated from the annular cylindrical structural members 40 and 42 and the sleeve 44 has been deployed to extend aft behind the booster 12. After the booster 12 has landed in the water 50 nose first and assumed a horizontal floating attitude, the open ended sleeve 44 extends aft of the booster 12. The sleeve 44 preferably comprises a suitable flexible water impermeable elastomeric fabric that is adapted to be easily folded and stored within the sleeve compartment 43. As the sleeve 43 rests in the water the sleeve collapses inwardly upon itself generally its entire length and the adjacent folds and surfaces of the sleeve 44 exert a surface tension therebetween to resist the tendency of the sea water to wick and migrate through the central length of the sleeve 44 to the rocket engine 32 and associated turbopumps. The sleeve 44 is constructed to be relatively impervious to water. It should also be understood that the booster 12 will not remain in the water 50 an extended period after impact but will be retrieved and removed from the sea water environment as promptly as possible. The length of the sleeve 44 will be determined by the volume of the sleeve compartment 43 available to stow the sleeve 44, the diameter of the sleeve 44, the length of time the sleeve will be expected to resist the migration of the water forwardly therethrough and a number of other factors.

METHOD OF OPERATION

In operation, the liquid rocket booster 12 is secured in a suitable manner to a space vehicle for launching into space. After the booster 12 has completed its mission it is separated from the space vehicle for return to earth and recovery. The parachute means 31 carried within the parachute compartment 30 is then deployed to permit the liquid rocket booster 12 to descend in a nose down attitude. Prior to impact of the booster 12 in a body of water, the blow off cover is separated from the cylindrical structural members 40 and 42 and the sleeve 44 is deployed aft from its stowed position within the sleeve compartment 43.

When the booster 12 impacts the water 50, the protective device 10 and the structural members 40 and 42 effectively surround and protect the rocket engine 32 and associated turbopump and nozzles 36 from impact damage.

The booster 12 now rest in a horizontal position on the surface of the water 50. The sleeve 44 extending aft of the booster 12 collapses against itself along its length and by means of surface tension exerted between the adjacent surfaces and folds of the sleeve 44 effectively resists the migration of the sea water toward and into the rocket engine 32. Thus, the present invention provides a crash protection device which effectively precludes impact damage and environmental damage to the rocket engine 32 and its associated elements of a liquid rocket booster thereby permitting the booster to be recovered and reused without undergoing an expensive and time consuming major overhaul.

Although the device and method of the present invention has been shown as described with reference to a particular embodiment, nevertheless, various changes and modifications obvious to one skilled in the art to which the invention pertains are deemed within the preview of the invention.

I claim:

1. A method of recovering a liquid propellant rocket booster having a rocket engine and turbopump for recovery and reuse after launch, comprising:
   deploying a parachute means carried by the rocket booster after the booster has separated from an associated space vehicle following launch so that the rocket booster is permitted to descend into a body of water in nose down attitude;
   providing on the aft end of the rocket booster cylindrical structural member that surrounds nozzles of the rocket engine to preclude crash damage to such nozzles when the rocket booster impacts the water;
   deploying a flexible water impervious sleeve member from the aft end of the rocket booster prior to impact in the water, said flexible sleeve member collapsing upon its length as the booster floats in the water to preclude migration of the water into the rocket engine and turbopumps.

2. A method according to claim 1 wherein the cylindrical structural member is double walled and the flexible sleeve member is stowed between such walls and during launch and deployed prior to impact.

3. In a liquid rocket booster for a space vehicle that has a turbopump driven rocket engine, and a parachute system which permits a controlled descent of the liquid rocket booster in a nose down attitude as it nears the earth for recovery in a salt water body after separation at a predetermined time from the space vehicle, which salt water body can cause impact damage and corrosion damage to the rocket engine, an improvement of a crash protection arrangement which permits recovery and reuse of the liquid booster rocket which comprises:
   cylindrical structure means which extend rearwardly from the aft end of the rocket booster to protect the rocket engine from damage upon impact of the booster in the salt water body, said cylindrical means having an annular chamber, a removable closure member, and the means to protect the rocket engine from salt water damage is arranged to deploy prior to impact, and
   flexible sleeve means carried within the annular chamber of the cylindrical structure means during launch of the space vehicle and extensible rearwardly from the rocket booster prior to impact after the removable closure structure is separated from the cylindrical structure means to preclude entry of salt water into the rocket engines,
   said means to protect the rocket engine from salt water damage includes an extensible sleeve means, said extensible sleeve means comprises an elongated sleeve secured at one end to the rocket booster and extends rearwardly from the aft end of the rocket booster as it floats horizontally in the salt water and as it trails from the rocket booster collapses against itself substantially it entire length and by surface tension exerted by the contacting surfaces of the sleeve along its length provides a seal against migration of salt water from its open end toward the rocket engine.

4. The liquid rocket booster of claim 3 wherein the cylindrical structural means extends rearwardly of the aft end of the rocket booster a distance at least as long as nozzles of the rocket engines.

5. The liquid booster of claim 4 wherein the cylindrical structural means is constructed sufficiently strong to preclude damage to nozzles of the rocket engine as the parachute system permits the rocket booster to descend into the salt water body upon return to earth.

6. The liquid rocket booster of claim 5 wherein the cylindrical structural means comprises two concentric sleeves that provide an annular chamber therebetween, and a removable closure member positioned in the open end of the structural means to seal the annular chamber during launch of the space vehicle.

7. The liquid propellant booster of claim 3 wherein the elongated sleeve comprises a flexible elastomeric fabric material.

* * * * *